Dec. 31, 1940.                K. SCHLESINGER                 2,227,024
                            ELECTRON SCANNING TUBE
                             Filed Nov. 6, 1937

Inventor:
Kurt Schlesinger

Patented Dec. 31, 1940

2,227,024

UNITED STATES PATENT OFFICE 2,227,024

ELECTRON SCANNING TUBE

Kurt Schlesinger, Berlin, Germany, assignor, by mesne assignments, to Loewe Radio, Inc., a corporation of New York Application November 6, 1937, Serial No. 173,084
In Germany November 11, 1936

4 Claims. (Cl. 250—153)

It has already been proposed to project an undistorted rectangular image on to the mosaic plate of a storing electron scanner by means of a deflecting mirror mounted inside the scanning tube. Particular reference has also been made to the advantages of avoiding the requirement of any corrections of keystone distortions by a deflecting mirror of this kind. The present invention relates to the particular method of deflection in a "mirror electron-scanner" of this character.

A particular embodiment of the mirror type of electron scanner with mixed electrostatic and magnetic deflection will be described in this specification. This method of deflection has the advantage of performing the entire $x$—$y$ deflection over the shortest possible length of the ray. A system for mixed electrostatic and electromagnetic deflection is therefore, in the preferred embodiment of the invention, combined with the deflecting mirror, and this preferably in such a manner that the mirror is arranged in the form of a metallic or metallized screening electrode in front of the deflecting plates in the direction towards the image screen and is maintained at a fixed potential, preferably earthed, whereby it is made possible to perform at least the line scanning by electrostatic deflection.

The invention will be fully understood from the detailed description which will now be given of an exemplary embodiment thereof which is illustrated in the accompanying drawing.

Figure 2:
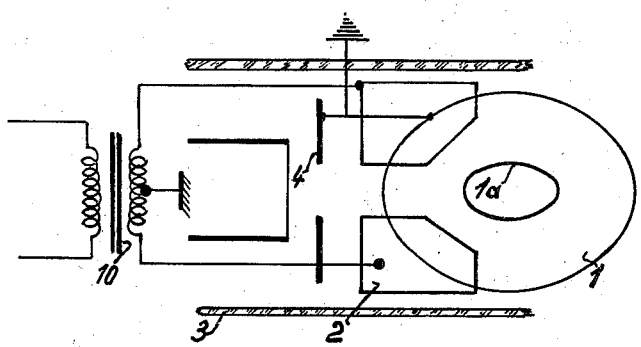
Figure 1:
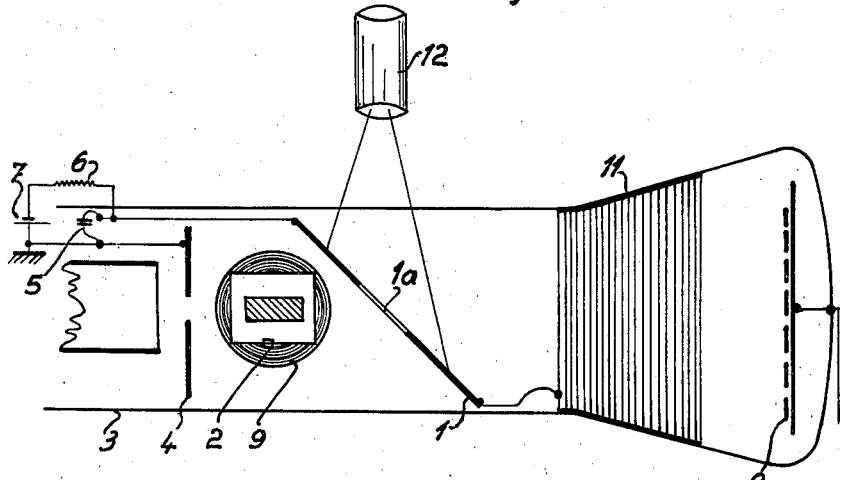

Figure 1 of which is a sectional elevation of a part of an election scanning tube embodying the invention, a few elements of the outer optical and electrical equipment being also indicated, whilst Figure 2 is a top plan view of a part of a tube of the same type as shown in Figure 1 and also shows a few elements of the operating circuits.

In the figures, 1 is the deflecting mirror, associated with a deflecting system 2. The deflecting system 2, as may be seen from the plan view (Fig. 2) preferably consists of box-like iron plate structures, which extend to the wall of the neck 3 of the tube. The mirror 1 is a metal plate or a metal-plated glass or mica plate, which may be in metallic connection with the anode 4, which results, in the arrangement shown, in the mirror being earthed. The connection with the anode may, however, also be merely capacitative, i. e. as shown, by way of a condenser 5 mounted outside of the tube, and a separate bias as indicated by source 7 can then be applied to the mirror by way of a resistance 6, so that the mirror may act at the same time as pick-up electrode for the photo-electrons from the mosaic 8.

A pair of coils 9 are fitted from the outside over the neck of the tube with pole pieces situated just over the ends of the sheet iron boxes 2 resting against the inside of the glass wall. In this way there is generated in the air gap between the plates 2 the magnetic deflection field for the frame change direction. The plates 2 are at the same time connected in push-pull connection with a relaxation oscillation voltage generator 10 (shown in the present instance as relaxation oscillation transformer), and thus cause a simultaneous line scanning deflection. The electric field between the plates 2 is at the same time effectively screened by the metallic deflecting mirror 1 against the discharge space of the image screen 8. This screening arrangement is still further improved by a metallic wall coating 11, which can be connected directly with the mirror 1. The light passes through an objective system 12 on to the deflecting mirror, and from there to the image screen. The projected diameter of the mirror should be equal to the diameter of the optical objective and the area of the aperture 1a in the mirror should not exceed 10% of the area of the mirror, to keep the light losses small.

Three advantages of the arrangement are: Elimination of the keystone distortion of the scanning or the image projection, constant sharpness of the spot over the entire image field as the length of the deflected ray is substantially constant, short length of the system, as frame deflection and line deflection take place over the same part of the total ray path.

The invention can naturally also be applied to tubes other than that shown, of types similar to that of the storing electron scanner known as the "Iconoscope."

I claim:

1. In a television transmitting tube comprising means for producing a cathode ray, a mosaic screen, deflecting means for causing said ray to scan said screen, and a plane mirror arranged inside the tube at an angle of substantially 45° for projecting the image to be transmitted on said screen, said mirror being elliptic so as to fill out substantially the whole width of the tube and of an area of an order of that of the mosaic, said mirror having a small aperture for passing said cathode ray and being conductive, an accelerating electrode formed as a conducting coating on the inner tube wall and intermediate the mirror and the mosaic, and a conductive connection between the mirror and the accelerating electrode for maintaining the accelerating electrode and the mirror at substantially like potentials.

2. In a television transmitting tube comprising means for producing a cathode ray: a mosaic screen, deflecting means for causing said ray to scan said screen, an anode, and a plane mirror arranged inside the tube and mounted between said deflecting means and said mosaic screen at an angle of substantially 45° for projecting the image to be transmitted on said screen, said mirror being elliptic so as to fill out substantially the whole width of the tube, having a small aperture for passing said cathode ray and being conductive and directly connected to said anode, said deflecting means consisting of a combined electrostatic and electromagnetic deflector.

3. In a television transmitting tube comprising means for producing a cathode ray: a mosaic screen, deflecting means for causing said ray to scan said screen, an anode, and a plane mirror arranged inside the tube and mounted between said deflecting means and said mosaic screen at an angle of substantially 45° for projecting the image to be transmitted on said screen, said mirror being elliptic so as to fill out substantially the whole width of the tube, having a small aperture for passing said cathode ray and being conductive and directly connected to said anode, said deflecting means consisting of a combined electrostatic and electromagnetic deflector, the electrostatic lines of which are parallel to the surface of said mirror.

4. In a television transmitting tube comprising means for producing a cathode ray: a mosaic screen, deflecting means for causing said ray to scan said screen, and a plane mirror arranged inside the tube and mounted between said deflecting means and said mosaic screen at an angle of substantially 45° for projecting the image to be transmitted on said screen, said mirror being elliptic so as to fill out substantially the whole width of the tube, being made of a thin metallized insulator, having a small aperture for passing said cathode ray and being conductive and connected to a high constant positive potential.

KURT SCHLESINGER.